(No Model.) 3 Sheets—Sheet 3.
W. H. SMYTH.
CAN HEAD SOLDERING MACHINE.
No. 519,206. Patented May 1, 1894.
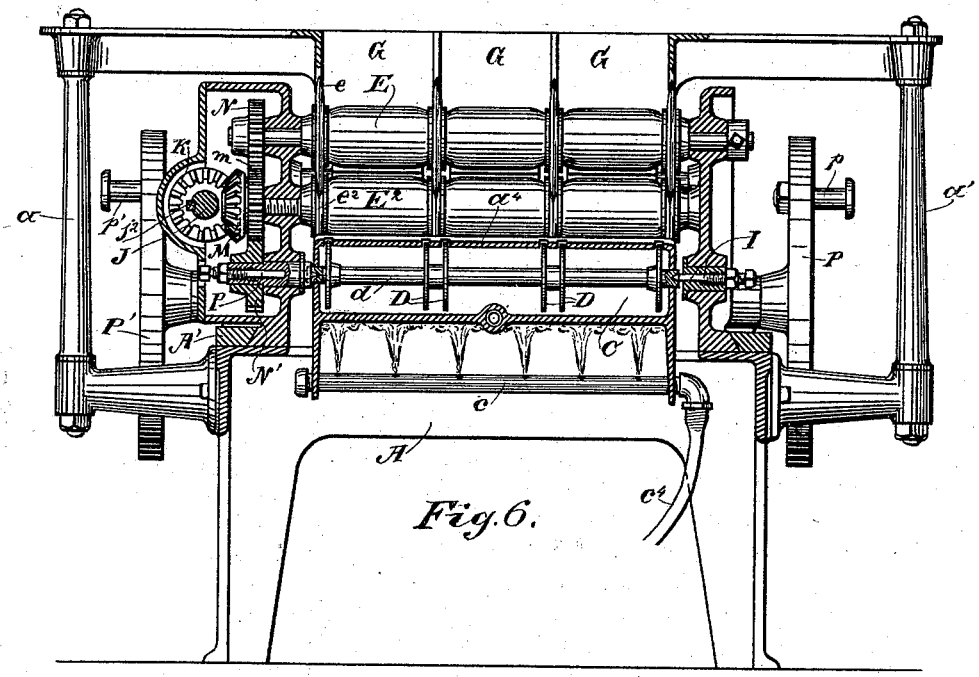
Fig. 6.
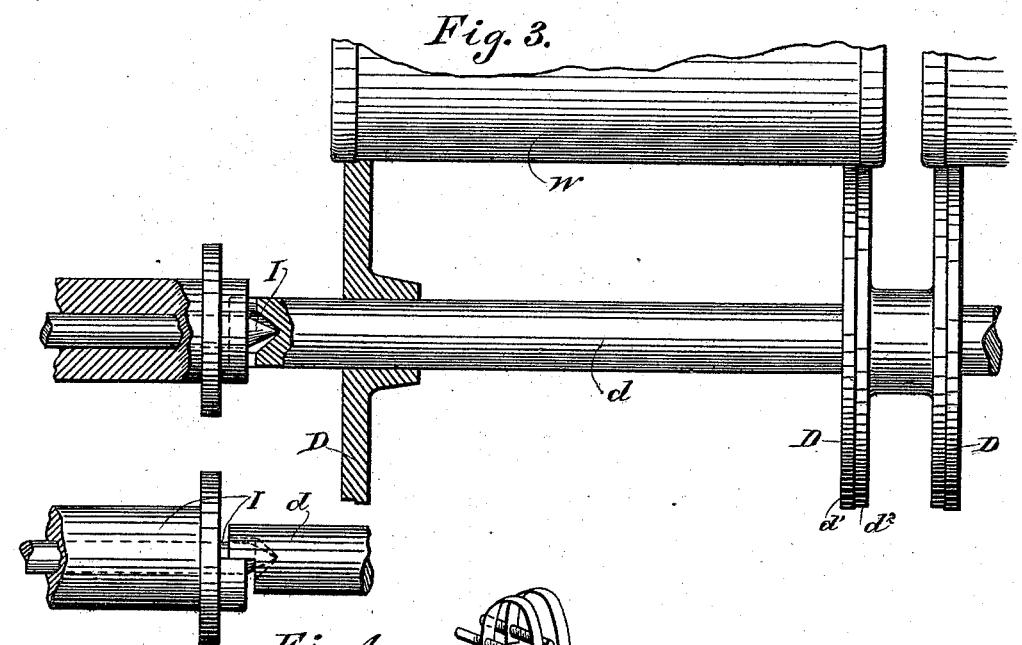
Fig. 3.
Fig. 4.
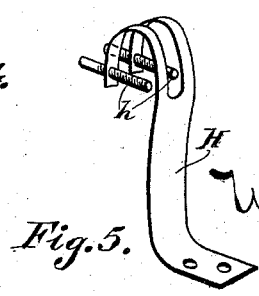
Fig. 5.
Witnesses:
G. H. Strouse
H. F. Ascheck
Inventor.
William H. Smyth

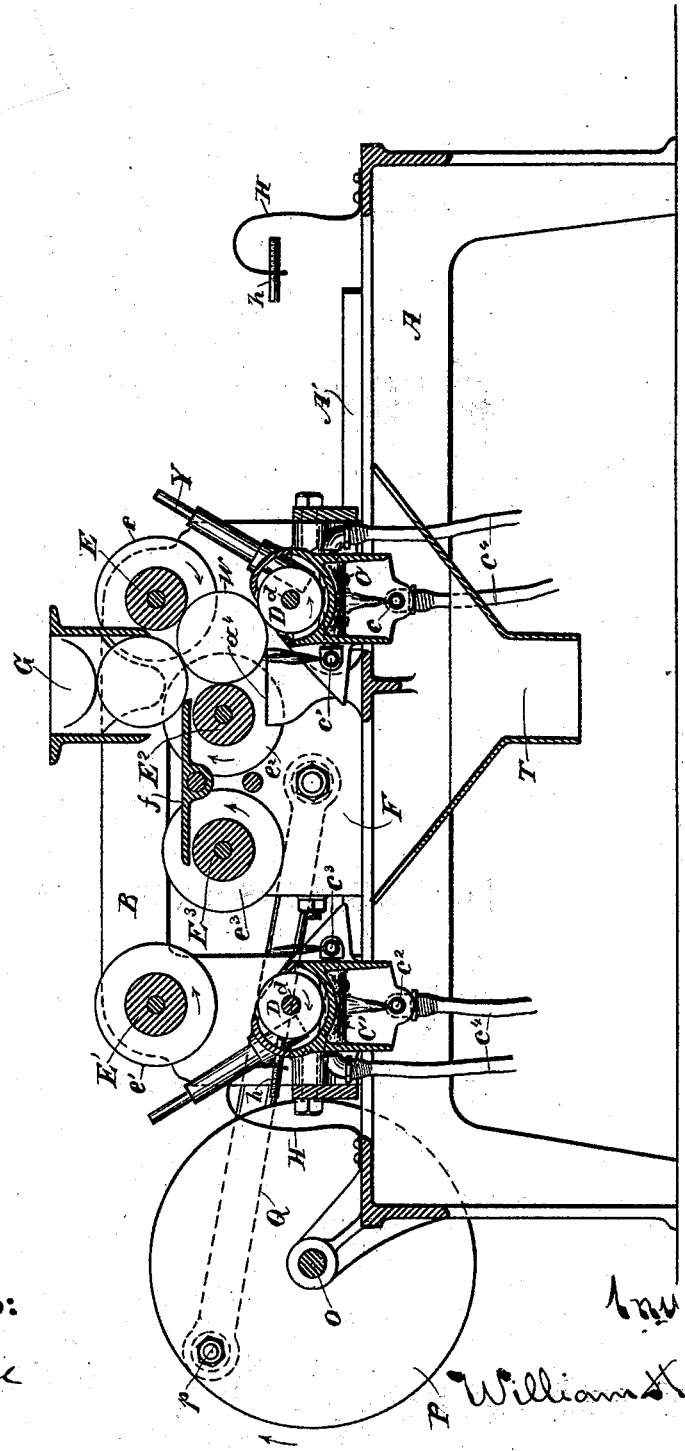

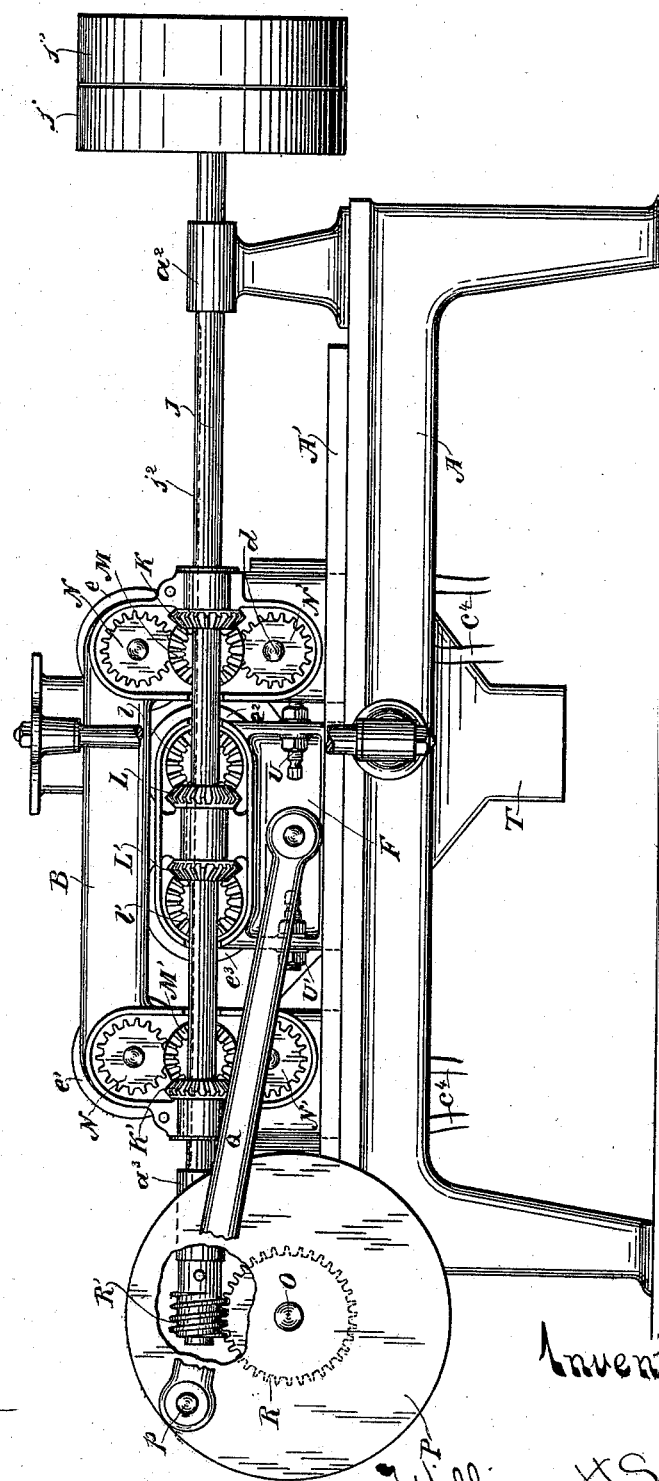

UNITED STATES PATENT OFFICE.

WILLIAM H. SMYTH, OF BERKELEY, CALIFORNIA.

CAN-HEAD-SOLDERING MACHINE.

SPECIFICATION forming part of Letters Patent No. 519,206, dated May 1, 1894.

Application filed June 12, 1893. Serial No. 477,367. (No model.)

*To all whom it may concern:*

Be it known that I, WILLIAM H. SMYTH, a citizen of the United States, residing at Berkeley, Alameda county, State of California, have invented an Improvement in Can-Head-Soldering Machines; and I hereby declare the following to be a full, clear, and exact description of the same.

My invention relates to the class of soldering machines, especially adapted for soldering the heads on cans.

It consists essentially in a rotating disk or series of disks for applying the solder, and means for holding the can in rotary contact therewith.

It also consists in the novel constructions and combinations hereinafter fully described and specifically claimed.

The object of my invention is to provide a simple, effective and rapidly operating machine for soldering the heads on cans.

Referring to the accompanying drawings for a more complete explanation of my invention,—Figure 1 is a longitudinal sectional elevation of my machine. Fig. 2 is a side elevation of same. Fig. 3 is a detail showing the form of the rims of the solder disks D and their impingement on the can W, and also the engagement of the screw center I with the solder disk shaft $d$. Fig. 4 is another view showing the engagement of the screw center I with shaft $d$. Fig. 5 is a perspective view of one of the springs H with the plugs or wipers $h$. Fig. 6 is a cross section of the machine taken through the central longitudinal plane of the solder pot C, showing the rolls E $E^2$, and soldering disks D in full.

The main frame A is provided on its upper surface with guides A', and carries and guides a freely movable carriage B. This carriage is an open frame, having ends in which are the solder pots C and C'. In these solder pots are adapted to rotate disks D secured upon a shaft $d$, suitably connected to the driving mechanism, which will be described fully hereinafter. Directly above these disks and journaled in the carriage B, are can driving rolls E and E', also suitably connected to the driving mechanism whereby they are rotated. These rolls have flanges $e$ and $e'$ for holding and guiding the cans.

Upon the main frame A, and between the guides A' and intermediate of the ends of the carriage C, is a reciprocating cross-head F, at each end of which is journaled driving rolls $E^2$ and $E^3$, similar to E and E', and these are also suitably connected to the driving mechanism whereby they are rotated. The rolls $E^2$ and $E^3$ are placed with reference to the solder disks D and upper rolls E and E' so that they are approximately central. The rolls $E^2$ and $E^3$ have flanges $e^2$ and $e^3$ for holding and guiding the cans. Upon the cross-head F is also placed a horizontal plate $f$ which forms a temporary support for the cans during the process of feeding. Between the ends of the cross-head F and inner sides of the ends of the loose carriage B, a space is left which permits of some motion in the cross-head without affecting the carriage B.

Supported on the main frame A by the standards $a$ and $a'$ is a feed chute or receptacle G, for supplying cans to the machine. This is formed with a series of compartments suitable in number to correspond with the number of solder disks provided in the machine.

Attached to each solder pot, and carried by it, are suitable burners $c$ $c'$ and $c^2$ $c^3$, having flexible connections $c^4$ for the supply of gas or other suitable combustibles.

Upon each end of the main frame A is placed a series of springs H, adjustably secured to each of which is a plug $h$ of wood or other suitable material, aligned with the solder disks.

In order to provide for the ready removal of the disk shaft $d$ it is made separate from the driving devices, and is supported upon adjustable centers I and I'.

The mechanism for reciprocating the cross-head F, the loose carriage B, and rotating the driver rolls E E' $E^2$ $E^3$ and solder disks D, is as follows, being clearly shown in Fig. 2: Horizontally of the machine and journaled upon the frame A, at $a^2$ and $a^3$ is a main driving shaft J, provided with a tight and a loose belt pulley $j$ $j'$. This shaft J is provided with a key-way or groove $j^2$, for the greater part of its length, and upon this shaft are bevel gears K and K', L and L'; K and K' being journaled, one at each end of the loose carriage B, and meshing into similar bevel gears M and M', journaled in the loose carriage B. Attached to the bevel gear M is a gear $m$, which meshes with the gears N and N' secured upon the shafts of the drive rolls E and the shaft $d$ of the solder disks, respectively. The gear K' is similarly connected with the driving rolls and solder disks at its ends of the machine. The bevel gears L and L', which are secured upon a common hub, mesh with the bevel gears $l$ and $l'$ secured upon the shafts respectively of the rolls $E^2$ and $E^3$. The gears K and K', L and L' slide freely upon the shaft J, but are provided with splines which fit into the key-way $j^2$ of the shaft and thereby drive the gears. The hubs of the gears form journals which rest in suitable bearing in the carriage B and cross-head, as clearly shown in Fig. 2. Transversely of the frame A, and at the opposite end from the tight and loose pulleys, is journaled a shaft O. Upon this shaft are secured crank disks P and P', provided with crank pins $p\ p'$. These crank pins are connected with similar pins on the cross-head F by means of connecting rods Q. On the same shaft O is rigidly secured a worm gear R, and upon the shaft J a worm R' meshing with worm gear R. At each end of the cross-head are adjustable bolts or screws U and U' suitably placed to come in contact with the inner faces of the ends of the carriage B, and thereby reciprocate the carriage B for a portion of the reciprocation of the cross-head. Upon the main frame A is a raised platform or rest $a^4$. A suitable discharge chute T is provided to convey the cans away when completed. Besides the burners $c\ c'$ for heating the solder, similar ones $c^2\ c^3$ are placed in front of each solder pot, and directly beneath the position occupied by cans in process of soldering, and so arranged that a flame may play upon the can near to each end. In Fig. 1 a can W is shown in position.

The operation is as follows: In practice, a number of cans having the tops and bottoms already applied, are fed by suitable runways to the chute G, and rest upon the top of the plate $f$. The reciprocation of the cross-head F carries this plate from under the cans, the lowermost of which immediately drop down on to the raised platform or rest $a^4$, and on the return stroke, these cans are caught between the driving roll of the cross-head, the upper driving roll of the carriage, and the solder disk. These rolls and disks being in rotation, cause the cans to rotate, and being in contact with the disks immersed in molten solder, the solder is thereby applied to the cans at the joints of the head with the can body. The set screws U and U' in the cross-head coming in contact with the loose carriage B, carry it and the confined cans to the end of the stroke, the set screws U and U' being suitably adjusted to give sufficient pressure to the cans to insure their rotating, without unduly squeezing them. Very nearly at the end of the stroke, the disks D come in contact with the spring wipers $h$, which prevent the disks from carrying up solder, and so, from that point, to the end of the stroke, the disks rotate against the cans, simply as hot disks and thereby wipe off any excess of solder which may have been applied by the disks, leaving a clean, smooth joint with a minimum of solder. When the cross-head has reached the end of the stroke and commences its return journey, it leaves the carriage behind, and the drive roll of the cross-head, releases the cans and permits them to roll away from the solder disk and so discharge. While performing the operation of soldering on one side of the stroke, the plate F has supported and passed from under the lowermost of the cans at the other side, and these drop on to the rest $a^4$, to be in turn picked up by the opposite drive roll, and thus on the return stroke of the cross-head, to be operated on in a similar manner to that just described. The solder is carried to the solder pots in any suitable manner shown in the drawings as by a tube Y placed at a nearly vertical angle, the solder feeding in by gravity and melted below. The flanges of the several driving rolls receive the cans between them and register them properly while the heads are being soldered. In this operation the cans are rotated while in a horizontal alignment, by means applied in rolling contact to their peripheries. Both heads of each can are soldered at one time, and by the lining up of a number of cans, several are soldered at once, the different cans being separated by the flanges of the driving rolls. The soldering disks may revolve in a direction opposite to that of the cans to rub and sweat the solder in. The form of contour of the rims of the soldering disks D, is to be of a character suited to the surface with which they come in contact and to which they apply the solder. Thus, in the present case, I have shown them with a rim having two portions, the one $d'$ being of greater diameter than the other $d^2$: the former comes in contact with the body of the can, and the latter in contact with the flange of the can head.

Having thus described my invention, what I claim as new, and desire to secure by Letters Patent, is—

1. In a can-head soldering machine, the combination of a rotating disk for applying the solder and means applied to the periphery of the can for holding said can in rotary contact with the rim of the rotating disk, substantially as herein described.

2. In a can-head soldering machine, the combination of a rotating disk for applying the solder and means applied to the periphery of the can for rotating said can in contact with the rim of the rotating disk, substantially as herein described.

3. In a can-head soldering machine, the combination of a rotating disk for applying the solder and a device for operating in rolling contact against the periphery of the can to rotate it in contact with the rim of the rotating disk, substantially as herein described.

4. In a can-head soldering machine, the combination of a rotating disk for applying the solder, and an opposing roll, between which and the rim of the disk the can is held and rotated, substantially as herein described.

5. In a can head soldering machine, the combination of a disk rotating in a plane at right angles to the axis of the can, and adapted to come in contact with the can head seam, a bath of solder in which said disk immerses its rim during a portion of its rotation, and means applied to the periphery of the can for holding said can in rotary contact with the rim of the rotating disk, substantially as herein described.

6. In a can head soldering machine, the combination of a disk rotating in a plane at right angles to the axis of the can and adapted to come in contact with the can head seam, a bath of solder in which said disk immerses its rim during a portion of its rotation, and means applied to the periphery of the can for rotating said can in contact with the rim of the rotating disk, substantially as herein described.

7. In a can-head soldering machine, the combination of a rotating disk, a solder bath in which said disk immerses its rim during a portion of its rotation, and a device for operating in rolling contact against the periphery of the can to rotate it in contact with the rim of the rotating disk, substantially as herein described.

8. In a can-head soldering machine, the combination of a rotating disk, a solder bath in which said disk immerses its rim during a portion of its rotation, and a series of rolls which rotate the can by rolling contact with its periphery and hold it in contact with the rim of the disk, substantially as herein described.

9. In a can-head soldering machine, the combination of a rotating disk for applying the solder, guides for holding the can accurately with the flanges of its head in contact with the rim of the disk, and means applied to the periphery of the can for rotating the can, in said contact, substantially as herein described.

10. In a can-head soldering machine, the combination of a rotating disk for applying the solder, guides for holding the can accurately with the flanges of its head in contact with the rim of the disk and means for rotating the can in said contact, consisting of a rotating roll applied in rotary contact to the periphery of the can, substantially as herein described.

11. In a can-head soldering machine, the combination of a rotating disk for applying the solder, a roll applied to the periphery of the can for holding and rotating it in contact with the rim of the disk and flanges on the roll serving as guides to accurately register and hold the can in said contact, substantially as herein described.

12. In a can-head soldering machine, the combination of a rotating disk for applying the solder, rolls adapted to impinge in rotary contact upon the periphery of the can to hold and rotate it in contact with the disk, and means for feeding and directing the can between the rolls, substantially as herein described.

13. In a can-head soldering machine, the combination of a rotating disk for applying the solder, means for holding and rotating the can in contact with the rim of said disk, and means for directing a flame against the rotating can, substantially as herein described.

14. In a can-head soldering machine, the combination of a rotating disk for applying the solder, means for directing the can to contact with the rim of the rotating disk, and a wiper adapted to act upon the rim of the disk at intervals, to remove its excess of solder, substantially as herein described.

15. In a can-head soldering machine, the combination of a rotating disk for applying the solder and a holder for the can movable to and from the disk to press the can into contact with its rim and to remove it therefrom, substantially as herein described.

16. In a can-head soldering machine, the combination of a rotating disk for applying the solder, and a holder movable to and from the disk and adapted to bear on the periphery of the can and press it against the rim of the disk, substantially as herein described.

17. In a can-head soldering machine, the combination of a rotating disk for applying the solder, and a rotating roll movable to and from the disk and adapted to receive the can between itself and the disk and to bear upon its periphery in rolling contact whereby said can is pressed up to and is rotated in contact with the rim of said disk, substantially as herein described.

18. In a can-head soldering machine, the combination of a rotating disk for applying the solder, an overlying driving roll, and a second driving roll movable to and from the plane of the disk and first roll whereby the can is received and held between the disk and rolls and rotated in contact with the rim of the disk, substantially as herein described.

19. In a can-head soldering machine, the combination of a reciprocating carriage, having a rotating disk for applying the solder, means for directing a can into rotary contact with the rim of the disk, and a stationary wiper with which the rim of the disk comes in contact at the end of the carriage movement, substantially as herein described.

20. In a can-head soldering machine, the combination of a freely movable carriage, having at each end a rotary disk for applying the solder, a reciprocating cross-head moving between the ends of the carriage and adapted by alternate contact therewith to reciprocate the carriage, and means carried by the cross-head for holding a can in rotary contact with the rims of the disks at each end of the carriage alternately, substantially as herein described.

21. In a can-head soldering machine, the combination of a freely movable carriage, having at each end a rotary disk for applying the solder, a reciprocating cross-head moving between the ends of the carriage and adapted by alternate contact therewith to reciprocate the carriage, and a driving roll mounted on the cross-head and adapted to press and rotate the cans in contact with the rims of the disks of the carriage, substantially as herein described.

22. In a can-head soldering machine, the combination of a freely movable carriage, having at each end a rotary disk for applying the solder, a reciprocating cross-head moving between the ends of the carriage and adapted by alternate contact therewith to reciprocate the carriage, and a driving roll mounted on each end of the cross-head and adapted to press and rotate the cans in contact with the rims of the disks at each end of the carriage alternately, substantially as herein described.

23. In a can-head soldering machine, the combination of a freely movable carriage having at each end a rotating disk for applying solder, and an overlying driving roll at each end, a reciprocating cross-head moving between the ends of the carriage and adapted by alternate contact therewith to reciprocate the carriage, and the driving rolls carried by the cross-head for holding the cans in rotary contact with the rolls and disks of the carriage, substantially as herein described.

24. In a can-head soldering machine, the combination of a freely movable carriage having at each end a rotating disk for applying solder, and an overlying driving roll at each end, a reciprocating cross-head moving between the ends of the carriage and adapted by alternate contact therewith to reciprocate the carriage, and the driving rolls carried by the cross-head for holding the cans in rotary contact with the rolls and disks of the carriage, and the adjustable stops in the ends of the cross-head for regulating the contact with the carriage ends and the consequent pressure of the rolls and disks on the cans, substantially as herein described.

25. In a can-head soldering machine, the combination of the main frame having the can receiving platform, the freely movable carriage on said frame, and having the feed chute for the cans, the rotating soldering disks and driving rolls of the carriage, the reciprocating cross-head operating between the carriage ends and adapted to reciprocate the carriage, the driving rolls of said cross-head and the plate thereof adapted to temporarily support the cans in the feed chute and to relieve them successively whereby they fall upon the receiving platform in position to be acted upon by the rolls and disks, substantially as herein described.

26. In a can-head soldering machine, the combination of the freely movable carriage having the solder pots, and the rotating disks partially immersed therein, and the reciprocating cross-head operating between the ends of the carriage to reciprocate it, and having the driving rolls for holding the cans in rotary contact with the rims of the disks, substantially as herein described.

27. In a can-head soldering machine, the combination of the freely movable carriage having the solder pots, the rotating disks partially immersed therein, and the overlying driving rolls, and the reciprocating cross-head operating between the ends of the carriage to reciprocate it, and having the driving rolls for holding the cans in contact with the disks and driving rolls of the carriage, substantially as herein described.

28. A can-head soldering machine having a device adapted to rotate a plurality of cans in axial alignment, and a suitable soldering device to apply solder to the cans while in rotation, substantially as herein described.

29. A can-head soldering machine having a device adapted to rotate a plurality of cans in alignment and rotating solder disks adapted to apply solder to the cans, substantially as herein described.

30. A can-head soldering machine having a device adapted to rotate a plurality of cans in alignment, rotating disks for applying solder, and a solder bath in which the rims of said disks are immersed during a portion of their rotation, substantially as herein described.

31. In a can-head soldering machine in which a plurality of cans is rotated in axial alignment, flanges separating and registering the aligned cans, substantially as herein described.

32. In a can-head soldering machine, rotating rolls for receiving and rotating a plurality of cans in alignment, said rolls having flanges separating and registering the aligned cans, substantially as herein described.

33. In a can-head soldering machine, the combination of rotating disks for applying solder, and rotating rolls adapted to receive and rotate a plurality of cans in alignment, said rolls having flanges separating and registering the cans whereby they are directed accurately to the disks, substantially as herein described.

34. In a can-head soldering machine, the combination of a device applied to the periphery of the cans for rotating said cans, a bath of solder, and a suitable conveyer for conducting solder from the bath and applying it to the rotating cans, substantially as herein described.

35. In a can-head soldering machine, the combination of a device adapted to rotate a plurality of cans in axial alignment, a solder bath and a conveyer for conducting solder from the bath and applying it to the rotating cans, substantially as herein described.

36. A can-head soldering machine having a device for rotating a plurality of cans by engagement with their peripheries, a solder bath, and a conveyer adapted to conduct and apply molten solder simultaneously to each end of each can combined, substantially as herein described.

37. In a can-head soldering machine, the combination of a means for effecting the travel of a can, means for rotating it while traveling, a solder bath traveling with the can and traveling means for applying solder to the can, substantially as herein described.

38. In a can-head soldering machine, a rotating disk for applying solder and means for oppositely rotating the can in contact with the rotating disk combined, substantially as herein described.

39. In a can-head soldering machine, a series of solder applying disks and a device adapted to hold and oppositely rotate a plurality of aligned cans in rotary contact with the solder disks combined, substantially as herein described.

40. In a can-head soldering machine, a rotating disk for applying the solder, said disk having its rim formed in portions of different diameters whereby contact is made with both the body of the can and the flange of its head, substantially as herein described.

41. In a soldering machine, the combination of means for feeding a multiplicity of cans simultaneously to suitable soldering devices, and automatic means for simultaneously discharging the same when soldered, substantially as herein described.

42. In a soldering machine, the combination of automatic means for feeding a multiplicity of cans simultaneously, and suitable soldering devices adapted to solder said cans simultaneously, substantially as herein described.

43. In a soldering machine, the combination of means for feeding a multiplicity of cans simultaneously, suitable soldering devices for soldering cans simultaneously, and automatic means for simultaneously discharging the same when soldered, substantially as herein described.

44. In a soldering machine, automatic means for feeding a multiplicity of cans in combination with a series of solder applying disks rotating transversely to the axes of the cans, substantially as herein described.

45. In a soldering machine, means for feeding a multiplicity of cans simultaneously to a series of solder disks secured upon a shaft rotating transversely of the axes of the cans, and suitably spaced to apply solder at each joint of the can heads or covers with the body of the can, and a suitable solder bath in which the solder applying disks immerse themselves during a portion of their revolution, substantially as herein described.

46. In a soldering machine, the combination of a series of rotating disks mounted on a horizontal axis and adapted to apply solder to the joints of the can heads or ends with the bodies of a multiplicity of cans simultaneously, and means for rotating a multiplicity of cans in rotary contact with the solder applying disks, substantially as herein described.

In witness whereof I have hereunto set my hand.

WILLIAM H. SMYTH.

Witnesses:
S. H. NOURSE,
H. F. ASCHECK.